3,354,107
TACKIFYING CEMENTS FOR EPM
AND EPDM RUBBERS
Parviz Hamed, Akron, Ohio, assignor to B. F. Goodrich Company, New York, N.Y., a corporation of New York
No Drawing. Filed Sept. 28, 1965, Ser. No. 491,008
4 Claims. (Cl. 260—31.2)

ABSTRACT OF THE DISCLOSURE

An improved tackifying cement is provided for EPM and EPDM rubbers. A napthenate is added to a tackifying cement that provides short term building tack. The additive increases the storage life of the tacky stock.

---

This invention relates to tackifying cements for use with elastomeric materials based on ethylene-propylene copolymers and ethylene-propylene-diene terpolymers and to a method of preparation of said cements. It more particularly relates to an improved tackifying cement for use with the said polymers which has a vastly increased tack retention on storage compared to materials of the prior art.

Any synthetic elastomer is of interest to the manufacturer of molded, extruded and cast articles made traditionally from natural rubber or any of the synthetic substitutes and alternative materials for natural rubber which have been developed in recent years. Elastomers currently receiving much attention, particularly because of their low cost and high resistance to weather, age, heat and ozone, are copolymers of ethylene and propylene and the terpolymers of ethylene-propylene and a straight chain or cyclic diolefinic material, the manufacture of which is disclosed in United States patents including 2,933,480, 3,000,866 and 3,000,867. These ethylene-propylene-diene terpolymers are currently identified as EPDM rubbers in the ASTM designation D1418–56T, and ethylene-propylene copolymers are designated as EPM rubbers. Hereinafter, when EPDM rubbers are referred to it is to be understood that EPM rubbers are meant as well. The major difference between the two types of materials is that EPM rubbers are cured in a peroxide cure system. They are so completely unsaturated that a sulfur cure is not possible. EPDM rubbers, containing some unsaturation in the diene component present, do undergo sulfur cure. A major deficiency of EPM and EPDM rubbers, in the eyes of the rubber industry is their lack of tack, which makes it impossible to build shaped articles by the processes employed with natural rubber.

To become a major item in the present day synthetic rubber industry, a material must lend itself to the manufacture of shaped articles such as tubing, belts, and the major product, tires. If a new material is low enough in cost and has sufficiently outstanding properties, the industry will make every effort to use it in spite of building tack deficiencies that make it more difficult to employ than the favorite natural rubber. Other synthetic materials, including styrene-butadiene rubber (SBR), and butyl rubber (IIR) have presented this same difficulty. The SBR and IIR materials lack the green strength and tackiness of natural rubber and tires and other rubber products have been successfully made from them only when compounding techniques and new additives have been developed that impart proper building tack to them. When natural rubber techniques are followed in building a tire from the ethylene-propylene-diene terpolymers, the effort meets with failure. Styrene-butadiene rubber can be formulated into tires using either blends with natural rubber or cements of high Mooney viscosity SBR with oil-soluble blocked phenolic resins. These techniques cannot be used with EPDM terpolymers. Blends of natural rubber and EPDM rubber do not cure compatibly. The SBR tackifying cements, when applied to EPDM rubber stocks, impart sufficient green strength for building a tire, but lack the ability to maintain adhesion at the stock interfaces when the tire is cured or vulcanized and the tire delaminates. Butyl rubber cements, made in a manner similar to SBR cements, but using butyl rubber, impart enough tack to butyl rubber to allow manufacture of butyl tires, but these cements do not help with construction of an EPDM tire because they do not tolerate the high oil levels in EPDM stocks. The prior art phenolic, terpene and natural resin tackifiers are actually found to severely retard ethylene-propylene-diene terpolymer cures and they also cause bloom when mixed into the bulk of the polymer. If one follows the teaching of the prior art and prepares similar cements of EPDM rubber and oil-soluble blocked phenolic resin, the effort of building an EPDM tire will not be crowned with success. The strength of uncured cement films of these materials is low. When coated with one of these tackifying cements and stored in conventional cloth liners according to industry practice, milled sheets of EPDM terpolymers lose virtually all tack imparted by the cement in 24 hours or less.

The property of tackiness in rubber and rubberlike materials has several aspects and is difficult to evaluate on a numerical basis. The Wallace Tackmeter is one laboratory instrument that has been devised to measure tack in rubber and rubber cements. Wallace Tackmeter results reported herein are obtained using a 180 g. load and a contact time of one minute. Unfortunately, a sample exhibiting good tack sufficient for building a tire, for example, will register above the maximum tackmeter reading of 1000. Tack contributes green strength or building strength to a rubber so that a shaped article will hold together as it is formed and carried to the vulcanizer and in vulcanization it contributes to the ability of the article to cure without losing interface adhesion at the ply surfaces. In the forming of a shaped article, the materials must have the property of "quick grab," that is, when lightly and rapidly touched together, they should immediately adhere to each other with sufficient force to support their own weight. When two pieces are lightly pressed together, held together approximately one second, then pulled apart, the degree of hand pull is a measure of tack. When two pieces are touched together, pulled apart, and touched together again, the materials must adhere firmly after the final contact. Subjective evaluations of tack of this nature are extremely valuable and accurate when performed by one skilled in the art. They are referred to as "Quick Tack," "Hand Pull," and "Repeat Tack" tests. A further test that is important in evaluating rubbery stocks for use in construction of tires is the static cured adhesion test. In this test, two pieces of stock 6″ x 1″ x ½″ are coated on one side with tackifying cement. The samples are allowed to stand until the solvent has evaporated, then the cemented sides are pressed together for 60′ at 302° F. under 200 p.s.i. pressure. The cured sample is then subjected to 180°, 10″ per minute pull in an Instron tensile test machine. The sample should fail in the stock, not in the cement line. Copending application Ser. No. 491,035, filed Sept. 28, 1965 discloses and claims a method for preparing a tackifying cement for EPDM stocks comprising combining solutions of (1) a reinforced base polymer, (2) a raw polymer cohesive agent, and (3) a tackifying resin and softening agent. When this cement is coated on the surfaces of EPDM stock, it provides excellent tack, good adhesion of the interfaces after vulcanization, and retention of tack strength when stock is stored in conventional cloth liners, according to industry practice, for periods up to one week.

A method has now been discovered of modifying this EPDM tackifying cement to provide improved retention of tack after storage of uncured, cemented materials.

This tack retention period lasts up to 3 weeks or longer and is the unexpected result of the addition of a naphthenic acid salt to the tackifying and softening component of prior art tack cements that maintain tack for only 1 week or less.

These tackifying cements for EPDM materials are made up of (1) a reinforced base polymer or blend of polymers with cure rates, and unsaturation levels very similar to the compounds to be coated, that is, EPDM polymers are used, (2) a cohesive agent to improve cement green strength, and (3) a tackifying and softening agent to impart stickiness and strength to the cement. Elements (1), (2) and (3) must be dissolved in certain solvent systems and the order of mixing is important. The reinforcement, generally carbon black, but optionally silica, is separately incorporated into the solid terpolymer by mill or Banbury mixing before this component (1) is dissolved in solvent for final mixing with components (2) and (3). Carbon black, zinc oxide and conventional cure systems are combined with the base polymer before it is dissolved in the solvent.

The cohesive agents, which improve the green strength of the cement, include polymers that possess the property of maintaining a breaking stress higher than the yield stress in the uncured state and include polychloroprene, butyl rubber (isopreneisobutylene copolymer of about 60–80 Mooney viscosity ML 8' at 212° F.), commercial high molecular weight halogenated butyl rubbers (60–80 Mooney), chlorosulfonated polyethylene (Cl=27–37%, S=0.8–1.6%), chlorinated polyethylene (Cl=25–36%) and polyisobutylene (mol wt. 100,000–200,000). The amount of cohesive agent is held from 5 to 25 parts per 100 parts of building polymer because excessive amounts of cohesive agent severely limit cured adhesion.

The softening agents, which impart stickiness to the cement film and contribute tack retention are low molecular weight poly-alpha olefins based on monomers containing 3–6 carbon atoms, including low molecular weight (1000–2400) polybutene-1 and amorphous polypropylene (10,000–40,000). Adhesive strength is imparted to the cement by tackifying resins, including oil-soluble alkyl-substituted phenol-formaldehyde resins and alkyl-substituted phenol-acetylene condensation product resins, and terpene resins. The alkyl substituent group contains 1–20 carbon atoms. These resins preferably have a melting point range of 50°–240° F., are oil-soluble and either heat reactive or non-heat reactive. From 20 to 100 parts of softening agents are used per 100 parts base polymer. From 10 to 40 parts of tackifying resin are used per 100 parts base polymer.

The (1) reinforced base polymer, (2) cohesive agent and (3) softening and tackifying agents are separately dissolved in a solvent selected from the class consisting of aliphatic and chlorinated aliphatic solvents. Representative solvents include hexane, naphtha, 1,1,1-trichloroethane, 1,1,2-trichloroethylene, carbontetrachloride, and the like. Aromatic solvents give decreased tack levels when they are used. Mixtures of these solvents may also be used. The final blend is stirred until it is a smooth cement and is diluted to a consistency of 5% to 20% total solids.

A tackifying cement containing the elements described above and prepared in the manner described above can be applied to layers or sheets of EPDM terpolymer and will serve to tackify the rubbery polymer sufficiently that shaped articles such as belts and tires can be formed, and cured. After cure the articles show no evidence of delamination at interfaces of the ply layers.

A limitation on the tack qualities of this cement is the fact that, once tackified, the terpolymer stocks must generally be used in one week or less or they will have lost such a great degree of their tackiness that the uncured articles cannot be assembled. Further, tackifying cements of this prior art are lacking in resistance to dynamic stress. In the adhesion of tread splices in a tire manufacturing operation, for instance, they are deficient in adhesion.

It has now been discovered that the tackifying cement prepared by blending individual solutions of reinforced EPDM polymer, cohesive agent and softening and tackifying agent can be improved to have and to impart to EPDM stocks tack sufficient for building operations that will be satisfactorily retained, and will be sufficiently resistant to static and dynamic stress to enable the construction of large articles, such as tires, from stocks prepared and kept in warehouse storage for periods as great as 3 weeks.

Tackifying cements prepared according to this invention contain 10%–30% by weight of a naphthoic acid salt or ester based on the weight of tackifying resin used. It is combined with said tackifying resin and the softening agent in a solvent for mixing with the separately dissolved reinforced base polymer and cohesive agent.

Any naphthoic acid ester or metal salt is useful in the practice of this invention. The general formula is

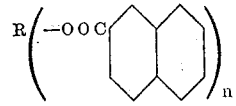

wherein R is an alkyl hydrocarbon or a metal ion and $n$ is a number from 1 to 2. Alkyl radicals containing 1–12 carbon atoms are preferred. If R is a metal ion, it is preferably Zn, Ag, Cd, Co, Fe, or Ni with Zn most preferred.

The following examples will serve to illustrate the invention. Where stated, parts are parts by weight.

Example I

A commercial EPDM terpolymer, 65 mol percent ethylene, 1.5 mol percent diene, DSV 2.3, is mill-blended with carbon black for reinforcement and miscellaneous curatives. The ingredients are thoroughly mixed on a mill and dissolved in a solvent, a lead-free gasoline with a distillation range of 105°–286° F. A cohesive agent, a raw polyisoprene-isobutylene rubber, average ML of 80, average unsaturation level 1.75%, is separately dissolved in solvent. A softening agent, polybutene-1, molecular weight 1100–2500 is combined with a tackifying resin, a condensation product of acetylene and p-tert.-butyl phenol, and the mixture is dissolved in a solvent. The three solutions are blended and diluted to 10% total solids. To batches of cement are made. Batch A illustrates the practice of the prior art in preparing EPDM tackifying cement, and Batch B shows the effect of the addition of a small portion of a naphthoic acid salt to the tackifying resin. The cements are coated on commercial high Mooney EPDM terpolymer stock and tested for tack by hand pull, quick grab, static adhesion, and dynamic adhesion tests.

| Material | Parts | |
|---|---|---|
| | A | B |
| Reinforced Base Polymer: | | |
| EPDM (80 Mooney) | 100 | 100 |
| Carbon black | 60 | 60 |
| Zinc oxide | 5 | 5 |
| Paraffin process oil | 5 | 5 |
| N-methyl-N-4-dinitrosoaniline | | 0.5 |
| Tetramethylthiuram disulfide | 1.5 | 1.5 |
| Benzothiazyl disulfide | 0.75 | 0.75 |
| Sulfur | 1.5 | 1.5 |
| Solvent | (¹) | (²) |
| Tackifying resin | 30 | 30 |
| Softening agent | 50 | 50 |
| Zinc naphthoate | | 0 |
| Cohesive agent | 10 | 10 |

TEST RESULTS

| Hand Pull: | | |
|---|---|---|
| Fresh | Good++ | Very good. |
| Aged 3 weeks at room temperature in cloth liners. | Good- | Do. |
| Quick Grab | Good | Do. |
| Cured static adhesion, lbs. per in.: | | |
| Room temperature | 153s [3] | 152s. |
| Aged 3 days at 212° F., pulled at 212° F | 90s | 83s. |
| Dynamic adhesion (laboratory flex machine) reported as number of cycles: | | |
| Room temperature | 2.7×10⁶s | 2.5×10⁶s. |
| Aged 3 days at 212° F., run at RT | 2.1×10⁶s | 2.3×10⁶s. |

[1] 50 Hexane/trichloroethylene.
[2] Gasoline (distillation range 105°–286° F., lead free).
[3] s=failure in the stock.

The sample tackified with cement B has equivalent cured static and dynamic adhesion to that adhered with cement A. Further, however, the cement B imparts considerably more tack initially when the stocks are fresh and the margin between the two is much wider in favor of B after the samples are stored in cloth liners for three weeks and then tested in the uncured state.

I claim:
1. A tackifying cement for providing building tack to ethylene-propylene copolymer and ethylene-propylene-diene terpolymer elastomers comprising a blend of separate solutions of:
   (1) 100 parts of a base polymer comprising a terpolymer of ethylene, propylene and a material selected from the group consisting of straight chain and cyclic diolefins,
   (2) 5–25 parts of a cohesive agent selected from the group consisting of polychloroprene, butyl rubber, halogenated butyl rubber, chlorosulfonated polyethylene, chlorinated polyethylene and polyisobutylene,
   (3) a mixture in solution of:
      (a) 10–40 parts of tackifying resin selected from the group consisting of oil soluble alkyl-substituted phenol-formaldehyde resins, alkyl-substituted phenol-acetylene resins and terpene resins, said alkyl-substituent groups containing 1–20 carbon atoms,
      (b) 20–100 parts of a low molecular weight poly-alpha olefin based on a monomer containing 3–6 carbon atoms,
      (c) from 10% to 30% by weight of said tackifier resin (a) of a material selected from the group consisting of naphthoic acid esters and naphthoic acid metal salts.

2. The composition of claim 1 wherein the base polymer (1) is reinforced with a material selected from the group consisting of carbon black and silica.

3. The cement of claim 1 wherein said naphthoic acid ester is an ester of the formula

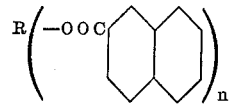

wherein R is an alkyl radical of 1 to 12 carbon atoms and $n$ is a number from 1 to 2.

4. The cement of claim 1 wherein said naphthoic acid salt is metallic salt selected from the group consisting of Zn, Ag, Cd, Co, Fe and Ni naphthoate.

References Cited

UNITED STATES PATENTS

| 2,438,753 | 3/1948 | Kellog | 260—31.2 |
| 3,200,174 | 8/1965 | Adamek | 260—889 |

FOREIGN PATENTS 780,905  8/1957  Great Britain.

OTHER REFERENCES

Burhans et al.: Improved Synthetic Rubber Tack With Phenolic Resins, Rubberage, 92, February 1963, pp. 745–748.

MURRAY TILLMAN, *Primary Examiner.*

SAMUEL H. BLECH, *Examiner.*

M. J. TULLY, *Assistant Examiner.*